(12) United States Patent
Gill

(10) Patent No.: US 10,041,613 B1
(45) Date of Patent: Aug. 7, 2018

(54) UNIVERSAL COUPLING

(71) Applicant: Ajit Singh Gill, Taylorsville, UT (US)

(72) Inventor: Ajit Singh Gill, Taylorsville, UT (US)

( * ) Notice: Subject to any disclaimer, the term of this patent is extended or adjusted under 35 U.S.C. 154(b) by 0 days.

(21) Appl. No.: 15/466,667

(22) Filed: Mar. 22, 2017

Related U.S. Application Data

(60) Provisional application No. 62/448,786, filed on Jan. 20, 2017, provisional application No. 62/457,002, filed on Feb. 9, 2017.

(51) Int. Cl.
*F16L 23/18* (2006.01)
*F16L 23/00* (2006.01)

(52) U.S. Cl.
CPC ............ *F16L 23/003* (2013.01); *F16L 23/18* (2013.01)

(58) Field of Classification Search
CPC ......... F16L 23/003; F16L 23/18; F16L 23/02; F16L 23/028; F16L 23/0286; F16L 37/142; F16L 37/144; F16L 37/15; F16L 37/14
USPC ........................................ 285/298, 301, 305
See application file for complete search history.

(56) References Cited

U.S. PATENT DOCUMENTS

| | | | |
|---|---|---|---|
| 2,329,876 A * | 9/1943 | Castellano | F16L 19/06 285/298 |
| 4,097,074 A | 6/1978 | Nagao et al. | |
| 4,126,337 A | 11/1978 | Nagao et al. | |
| 4,275,909 A | 6/1981 | Yoshizawa et al. | |
| 5,387,017 A | 2/1995 | Gill | |
| 7,455,331 B2 | 11/2008 | Gill | |
| 8,474,880 B2 | 7/2013 | Gill | |
| 2002/0071718 A1 * | 6/2002 | Marty | F16L 37/1225 403/293 |
| 2005/0134040 A1 * | 6/2005 | Andre | F16L 37/144 285/305 |

FOREIGN PATENT DOCUMENTS

DE 4318878 A1 * 12/1994 ......... B60H 1/00571

OTHER PUBLICATIONS

American USA, "The American Earthquake Joint System." http://www.american-usa.com/resources/sales-brochures/earthquake-joint-systems-sb; Accessed on Feb. 28, 2017, 4 Pages.
(Continued)

*Primary Examiner* — David Bochna
*Assistant Examiner* — James A Linford
(74) *Attorney, Agent, or Firm* — Thorpe North & Western, LLP

(57) ABSTRACT

A coupling to connect a pipe end portion to another pipe end portion or to a valve or other fitting wherein the pipe end portion includes a circumferential shoulder includes a flange around an opening into the coupling through which the end portion of the pipe including the circumferential shoulder can be inserted into the coupling. A wheel with a radial channel therein is rotatably mounted on the flange with the flange received in the radial channel which is wide enough to also receive wedge members therein alongside the flange. Once the pipe end with the shoulder is received in the coupling, wedge members are inserted into the radial channel through a cut opening in a portion of the wheel to extend into and reduce the diameter of the opening to hold the shoulder in the coupling. A seal is provided in the coupling to seal the coupling against leakage.

21 Claims, 11 Drawing Sheets

(56) References Cited

OTHER PUBLICATIONS

American USA, "American Earthquake Joint System." http://www.american-usa.com/products/ductile-iron-pipe-and-fittings/restrained-joint-pipe/earthquake-joint-system; Accessed on Feb. 28, 2017, 1 Page.

Haddaway, "Earthquake-Resistant Ductile Iron Pipe Makes U.S. Debut In Los Angeles." WaterWorld; http://www.waterworld.com/articles/print/volume-31/issue-4/features/earthquake-resistant-ductile-iron-makes-u-s-debut-in-los-angeles.html; Accessed on Feb. 28, 2017, 8 Pages.

\* cited by examiner

SECTION A-A

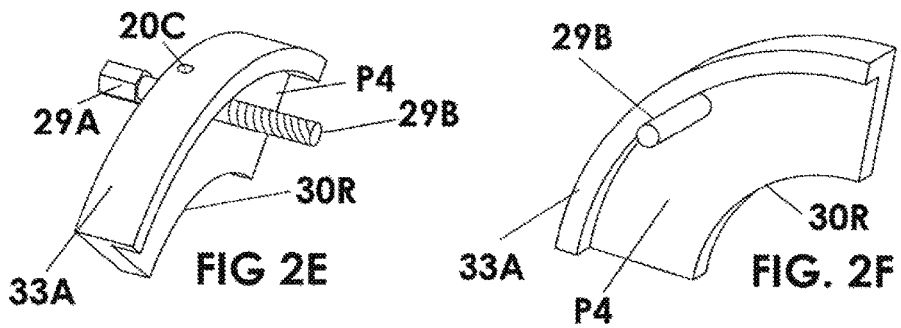
FIG 2E
FIG. 2F
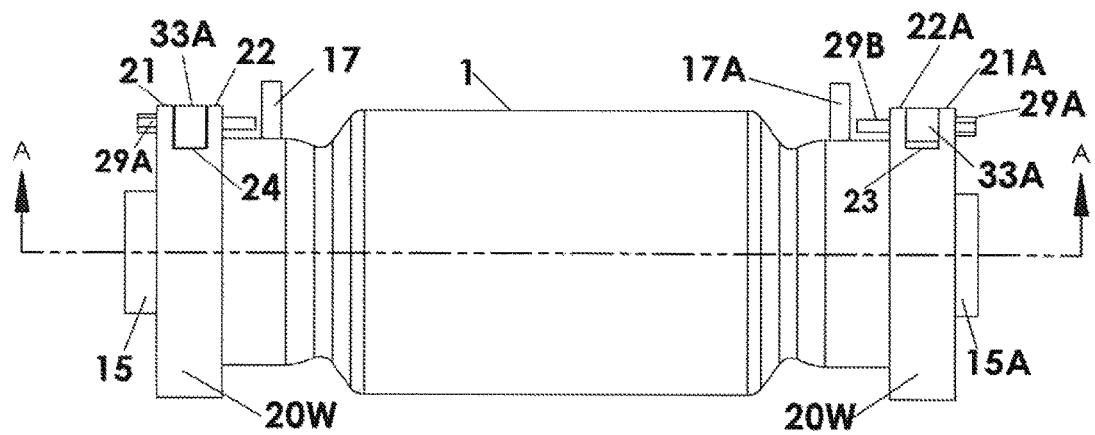
FIG. 2C
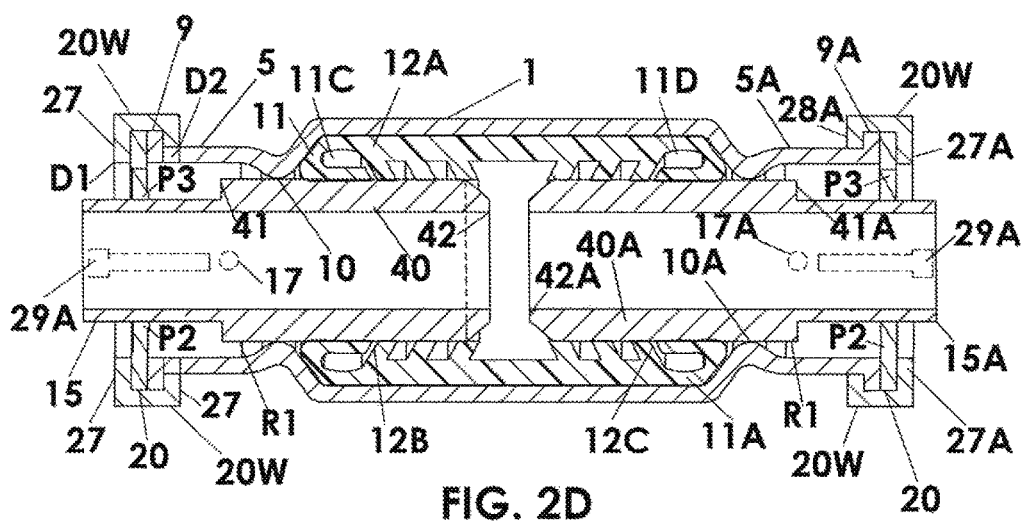
FIG. 2D

SECTION A-A

SECTION A-A

US 10,041,613 B1

UNIVERSAL COUPLING

PRIORITY CLAIM

Priority is claimed to U.S. Provisional Patent Application Ser. No. 62/448,786 filed Jan. 20, 2017 and U.S. Provisional Patent Application Ser. No. 62/457,002 filed Feb. 9, 2017, each of which are hereby incorporated herein by reference in their entireties.

BACKGROUND OF THE INVENTION

Field

The invention is in the field of pipe couplings to connect together two pipes having shoulders or flanges in their end portions and to connect a pipe end to a valve or other fitting.

State of the Art

There are many types of couplers for attaching the ends of pipes together. For example, Inventor holds U.S. Pat. Nos. 8,474,880 and 7,455,331 which show couplers for connecting pipe ends together where the pipes are provided with shoulders or flanges in their end portions. In many piping systems it is desirable to provide pipe connections designed to mitigate pipe damage with horizontal and vertical movement of the earth and to resist separation of the pipes and couplings and resultant leakage of couplings in the event of earthquakes. Currently, the Kubota bell joint using ductile iron pipe manufactured by Kubota Corporation of japan is considered a reliable joint during earthquakes, U.S. Pat. Nos. 4,097,074, 4,126,337, and 4,275,909. It would be advantageous to have seismically stable pipe joints for other types of pipes. Different types of pipe are made of different materials, such as steel, PVC, polyethylene, and fiberglass, and each pipe has its own standards. Large diameter polyethylene pipe commonly is fused for end to end pipe connections. Fiberglass pipe commonly is joined with glue. It would be advantageous to have a universal design of a coupling to connect pipes made from the same or different materials, and, in addition, to make such universal coupling substantially seismically stable.

SUMMARY OF INVENTION

The coupling of the current invention is particularly useful with pipes or fittings, such as valves, for use in piping systems for pipes provided with shoulders or flanges in their end portions, but can also be used with straight end pipes. The coupling body is preferably made of steel with two opposite symmetrical portions which are mirror images of one another to form a single piece seismic joint cylindrically stable coupling designed to mitigate pipe damage with horizontal and vertical movement of the earth. The coupling of the invention has distinct advantage over bell joint couplings designed for seismic standards and also provides an alternative to free pipe ends from the coupling body. In the event of earthquakes, the coupling of the invention will not separate from the pipes and will remain substantially water leak proof. The coupling of the invention provides a universal design of a coupling to connect pipes made from different materials and is adaptable for pipes having different diameters, other than IPS standards of pipes. The objects of the coupling of the invention are:

1. Where, coupling joint maintains its integrity during earthquakes.

2. Where, coupling joint handles thermal and Poisson's ratio effects.

3. Where, at least one coupling joint functions as a restrained joint as well as flexible joint.

4. Where, both ends of the coupling (with circumferential mini flanges) are modifiable for flange to flange connection or other type of connections.

5. Where, in case of steel pipes, one end or both ends of the coupling can be welded to steel pipe.

6. Where, in case of steel pipes, if the coupling develops a fluid leak, then, circumferentially along the inner radii of the two opposite walls of the wheel, steel wires can be welded to the pipe and coupling body to encase the fluid leak completely. Therefore, in an emergency of a fluid leak, one wall of each wheel can be welded to the pipe and the other wall of that wheel can be welded to the coupling body.

7. Where, the coupling can be reused once it is removed from the pipes.

8. Where, the coupling can be used to connect different pipes made of different material.

9. Where, the coupling does not harm the end portions of pipes as grip couplings with sharp steel teeth do.

10. Where, each flange at each end of the coupling is mounted around with a rotatable wheel provided with a cut opening means to load arcuate flat wedge plates to hold the pipe loosely and circumferentially.

11. Where, an arcuate wedge cover provides means to cover the cut opening in the wheel to keep wedges in place.

12. Where, after removing an arcuate wedge cover, flat wedge plates can be removed by rotating the wheel.

13. Where, for underground pipe for 50 years of design, the wedge cover can be welded to the open cut in the wheel, and the weld can be grounded off with a grinder when the wedge cover and wedges need to be freed from the wheel to disconnect the pipe from the coupling.

14. Where, the coupling can be modified to make a bell joint from the middle portion of the coupling body.

15. Where, the coupling can accommodate different designs of seals.

16. Where, ends of the coupling (wheel portions) can be covered with rubber or an elastomeric channel to protect ends from entering debris into the coupling body.

17. Where, the body of coupling can be modified for various types of connections, including quick connection, to connect the pipe with a valve, as inventor described it in U.S. Pat. No. 5,387,017.

According to the invention, a universal coupling has a coupling body to receive and hold therein the end portion of a pipe to be coupled and has a coupling body opening through which the end portion of the pipe to be coupled is inserted into the coupling body. The end portion of the pipe to be coupled is provided with a circumferential pipe shoulder or circumferential pipe flange thereon spaced a distance from the end of the pipe and adapted to be received in the coupling body when the end of the pipe is inserted into the coupling body. From here on, the terms "circumferential pipe shoulder" or "circumferential pipe flange" around the end portion of a pipe will be considered as equivalents, one including the other.

A coupling body flange extends around the coupling body opening. A radially channeled wheel is mounted on the coupling body flange with the coupling body flange received in the radial channel of the wheel, whereby the wheel can be rotated around the coupling body opening. The wheel includes an inner wall and an outer wall which form the channel, and an open cut in one circumferential portion of the wheel extending radially from the channel to outside the wheel through which a plurality of wedges can be sequentially inserted into the channel. The wedges are flat plates and may each be in the shape of a section of a washer having an inside opening of a diameter less than the diameter of the smallest circumferential pipe shoulder or circumferential pipe flange expected to be received in the particular coupling body concerned. The channel is wide enough to receive both the coupling body flange and a wedge inserted through the open cut into the channel. The outer wall has a central wheel opening aligned with the coupling body opening, with said wheel opening having a diameter large enough to receive the largest diameter circumferential pipe shoulder or circumferential pipe flange expected for a pipe to be received into the coupling body. When the wedges are inserted into the channel, the wedges will extend radially inwardly beyond the diameter of the inner wall central opening to reduce the diameter of the inner wall central opening so that a circumferential pipe shoulder or circumferential pipe flange received in the coupling body cannot pass through the reduced diameter inner wall opening formed by the wedges. In this way, the end portion of the pipe is held in the coupling body. The coupling will also include a seal therein for sealing the coupling around the pipe end received in the coupling body to thereby prevent leakage of fluid from the coupling.

When the coupling is provided to couple the ends of two pipes together, the end portions of the two pipes to be joined will be inserted into opposite ends of the coupling with a gap left between the pipe ends in the coupling body. The inner central section of the coupling body will bridge over the gap between the opposite ends of the two pipes. The inner central section of the coupling body is provided with two opposite elastomeric seals which open toward the center of the coupling body, i.e., toward the gap between the pipes. These seals get pressurized with the fluid flowing through the pipes and generally act as effective means to prevent leakage of the fluid from the coupling body. When the coupling is provided to couple the end of one pipe to a fitting, such as a valve, the coupling may be integrally formed with or otherwise attached to the fitting, such as by welding or other form of attachment, and positioned with respect to the fitting to connect the fitting to the end of the pipe. In such instance, the coupling body is provided with an elastomeric seal which fits around the end of the pipe and opens toward the fitting. Again, the seal get pressurized with the fluid flowing through the pipe and fitting and generally acts as an effective means to prevent leakage of the fluid from the connector. Alternately, when connecting a pipe to a fitting, the fitting can be provided with a pipe flange or pipe shoulder and connected to the end of the pipe as if it was another pipe.

To connect the coupling to the end portions of two pipes to be connected, first one end of the coupling is mounted loosely around the end of the first pipe and the coupling is pushed till the circumferential pipe shoulder or circumferential pipe flange on the end portion of the first pipe is within the coupling and the outer wall of the wheel is aligned with a temporary chalk mark on pipe. The temporary chalk mark will have been placed on the end portion of the pipe at a location indicating that a desired length of the end portion of the pipe has been inserted into the coupling. Then, the wheel is rotated so that the open cut is at the top of the wheel and wedges are loaded into the wheel channel one at a time through the open cut until they are circumferentially positioned around the pipe. When a wedge is inserted through the open cut at the top of the wheel, the first wedge inserted can slide by gravity, or can be pushed, in the channel around the pipe to the bottom of the pipe with subsequent wedges sliding into contact with this bottom wedge until the wedges surround the pipe. The wedges will form a wedge opening around the pipe having a diameter just larger than the outside diameter of the pipe, which is smaller than the diameter of the circumferential pipe shoulder or circumferential pipe flange. The wedges are locked into their positions with the wheel and, at the circumferential location of the cut opening in the wheel, by means of a wedge cover which closes the cut opening in the wheel. The wedge cover may be secured in place in the cut opening in the wheel by means of a bolt fastener or other fasteners. If desired, the wedge cover can be welded to the cut opening of the wheel, and when desired to be removed, the weld can be grounded off with a grinder to free the wedge cover and to free other wedges. After the wedges are mounted inside of the first wheel, then the first pipe is locked to the connector and cannot be pulled out of the coupling body. Thereafter, the end of second pipe is pushed into the other end of coupling body and, similarly to the end portion of the first pipe, the end portion of the second pipe is properly connected within the coupling body by insertion of wedges. When it is needed to disconnect the pipes, the wedges can be removed from one or both of the wheels by removing the wedge cover from one or both of the wheels and then rotating the wheel or wheels so the open cut in the wheel is at the bottom of the wheel so the wedges fall out of the wheel channel one by one through the open cut of the wheel. Since the wedges are separate pieces inserted into the coupling when pipes are attached, they can be shipped along with the shipment of the coupling to the job site, such as packed in a box, with the box stored in the barrel of the coupling.

DRAWINGS

The best mode presently contemplated for carrying out the invention is illustrated in the accompanying drawings, in which:

FIG. 2C is a side elevation similar to that of FIG. 1 showing the coupling of FIG. 1 with the coupling wheels mounted at the opposite ends of the coupling body;

FIG. 2D is a transverse longitudinal horizontal section of the coupling of FIG. 2C, taken on the line A-A of FIG. 2, with a monolithic seal mounted inside the coupling body;

FIG. 2E is perspective view of a wedge cover to cover the open cut in the left wheel of the coupling body;

FIG. 2F is the same wedge as in FIG. 2E for the wheel on the right side of the coupling body;

DETAILED DESCRIPTION OF THE OF THE ILLUSTRATED EMBODIMENTS

Figure 1:
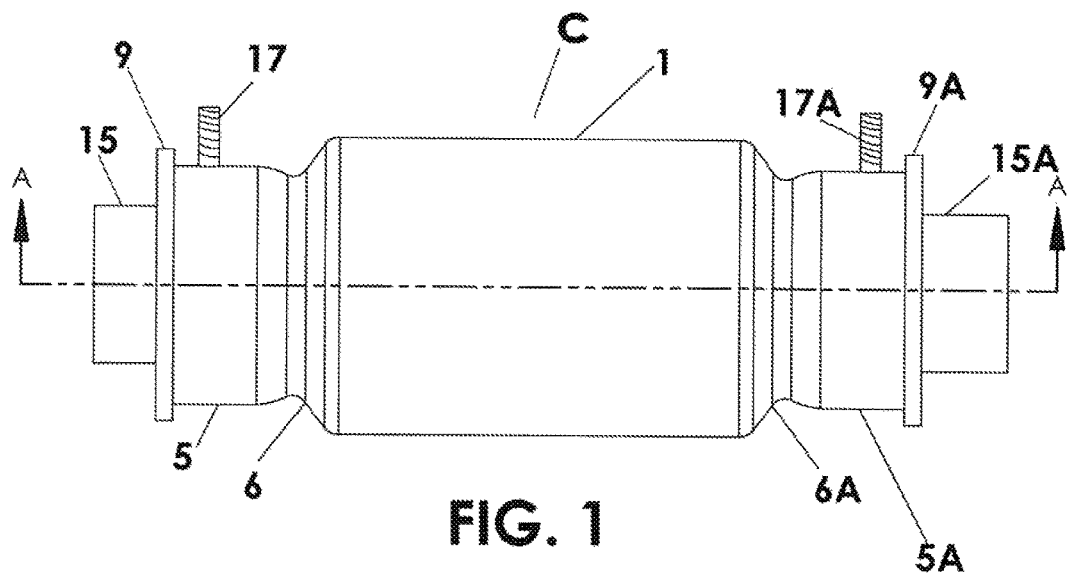
FIG. 1 is a side elevation of a coupling of the invention showing the coupling body with pipes to be attached extending from opposite ends of the coupling body, but without the wheels attached so that the body flanges on opposite ends of the coupling body are visible.
Figure 2:
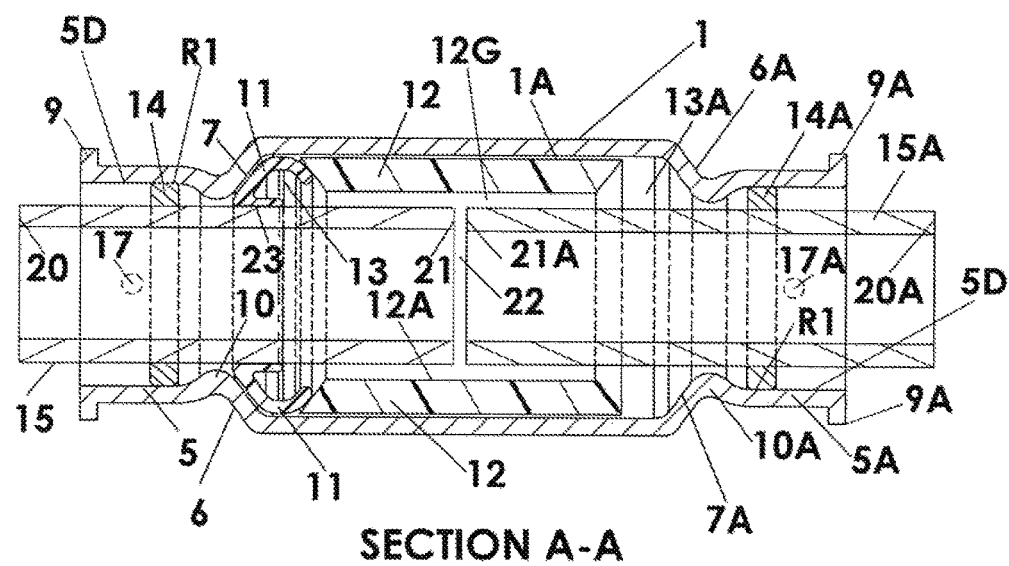
FIG. 2 is a transverse longitudinal vertical section of the coupling of FIG. 1 and shows two opposite seals within the coupling separated by an elastomeric partitioner between them.
Figure 3:
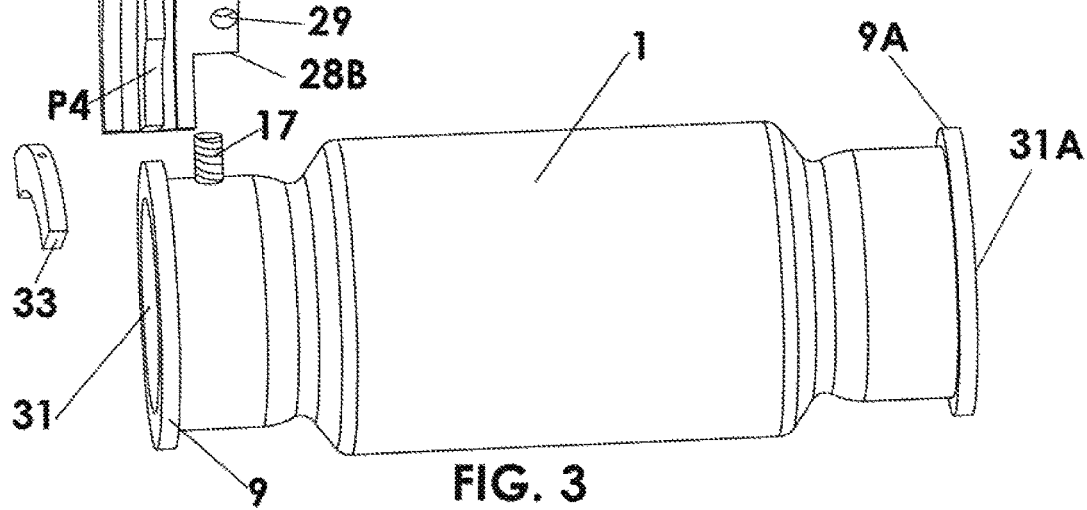
FIG. 3 shows perspective view of the coupling of FIG. 1 without pipes, and shows an alternate design of wedge cover with its perspective view, and also shows a perspective view of a wedge.

Drawings are not drawn to any particular scale. Most of the time when the same elements are repeated on both sides of the coupling, therefore to depict other body parts of the coupling, numbers of right side elements corresponding with the left side elements are assigned numbers appended with a letter. One half portion of the coupling depicts a symmetrical mirror image of the other half portion of the coupling body. Thus, when one side element is being explained, the corresponding element on opposite side of the coupling body will be considered explained simultaneously. FIGS. with or without wheels can be studied together. For ease to study drawings, FIGS. are grouped in the following sets:

FIGS. 1, 2C, and 3 depict the same coupling body without wheels.

FIGS. 3, 5, 5A, and 13 shows alternate designs of wedge covers.

Figure 11:
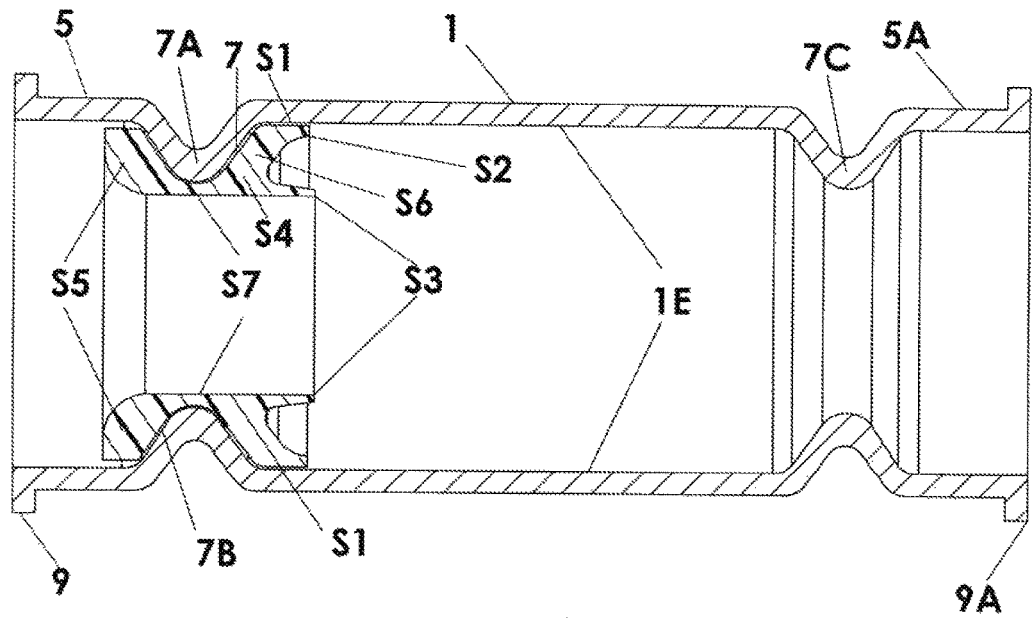
FIG. 11 is a traverse longitudinal vertical section of a coupling body with a seal fitted around the walls of a reverse cavity which opens exteriorly to the coupling body, where each cavity is a mirror of the other cavity.
Figure 12:
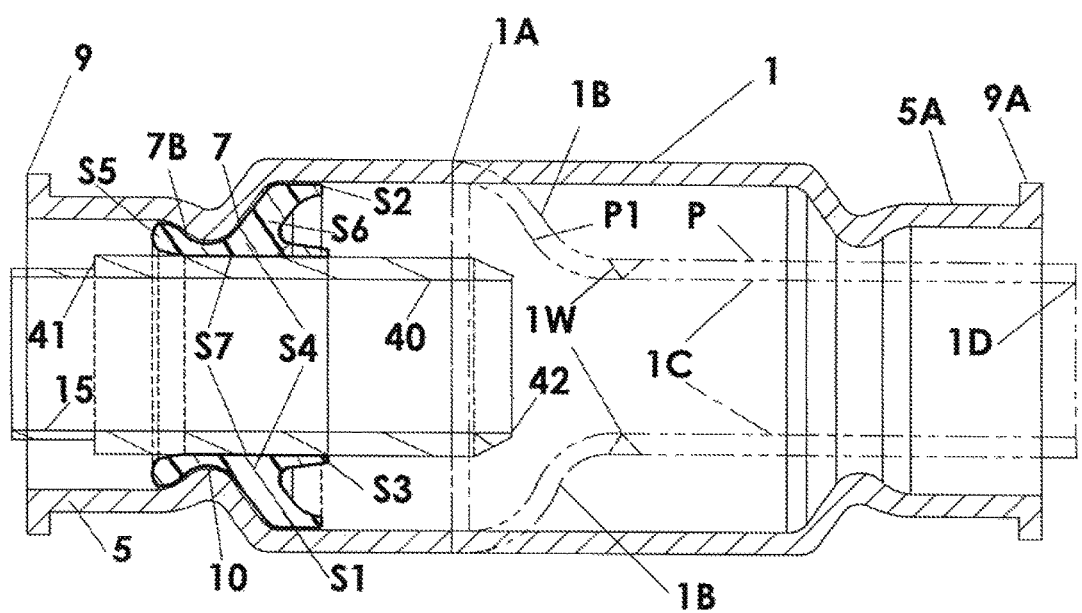
FIG. 12 is a variation of the coupling of FIG. 11 with the same seal, and depicts in broken lines how the coupling can be modified to a bell joint.

FIG. 11 shows a modified design of coupling body shown in FIG. 1 where, sections 1 and 5 and 5A all have same diameter. FIG. 12 shows modifications that can be made to the coupling of FIG. 11 to make a bell joint.

Figure 14:
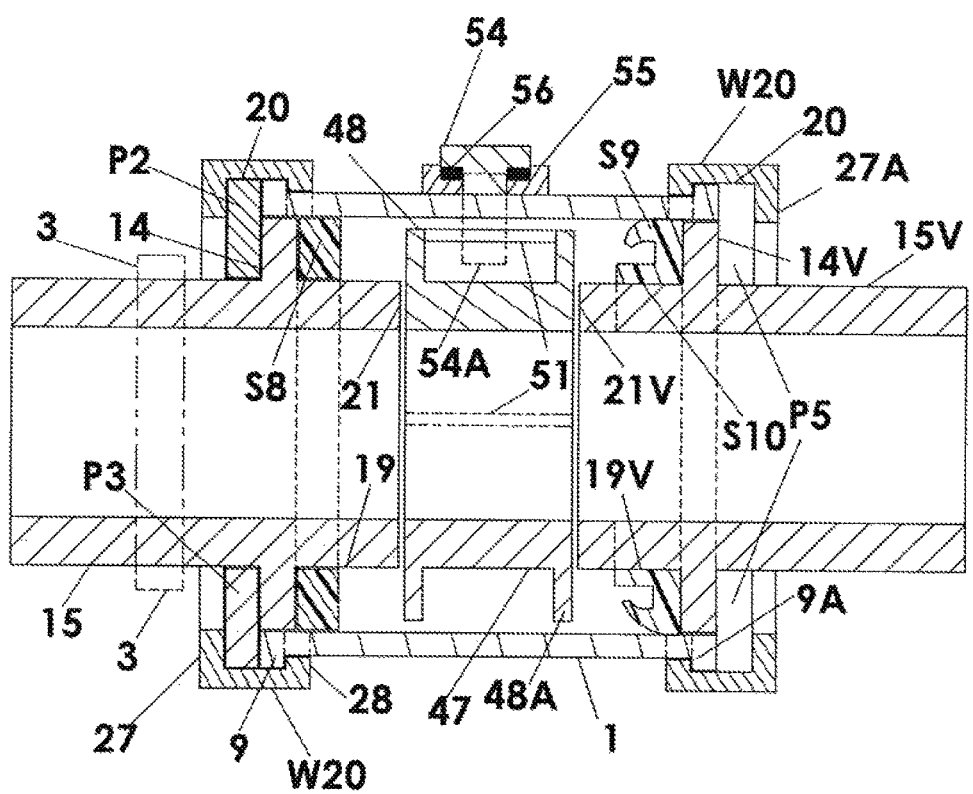
FIG. 14 is transverse longitudinal vertical section of a modified coupling body to connect a pipe end to a valve.
Figure 16:
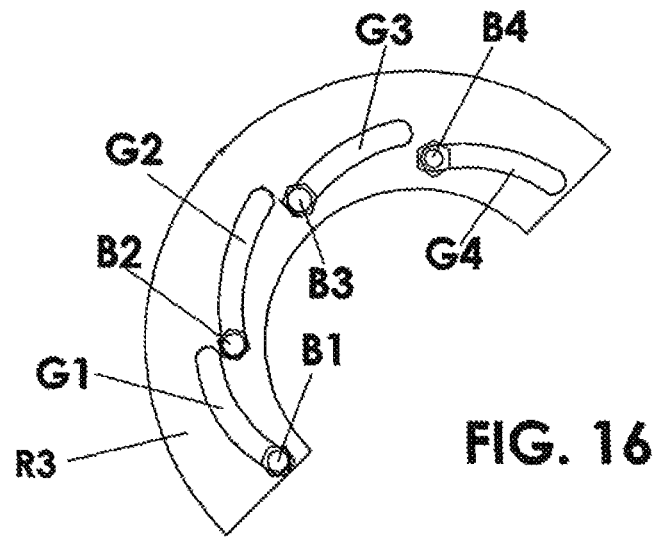
FIG. 16 is a side view of cam grooves showing heads of bolts which move through said grooves.
Figure 15:
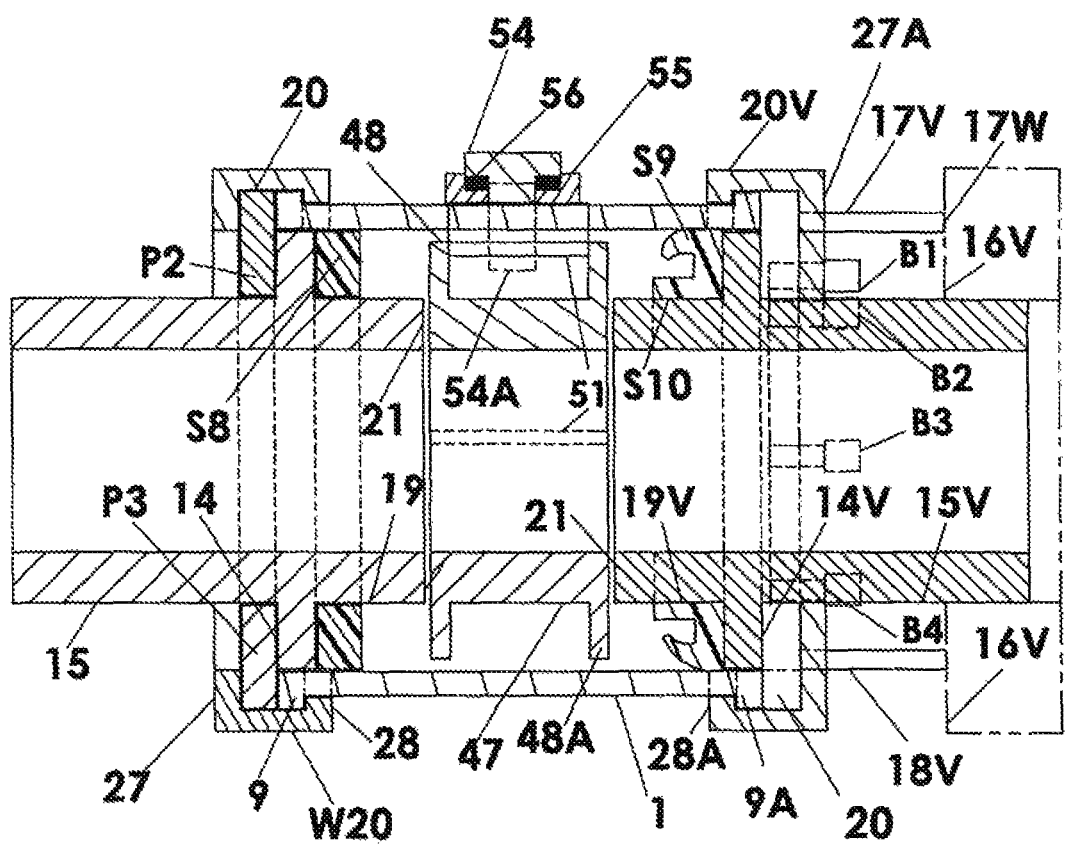
FIG. 15 is the same as FIG. 14, but one end of the coupling is modified to connect a pipe to a valve by means of cam rotary jaws for quick connection or for quick disconnection of the coupling from the valve.

FIGS. 14, 15, and 16 show modified coupling bodies for two types of valve connections.

Figure 17:
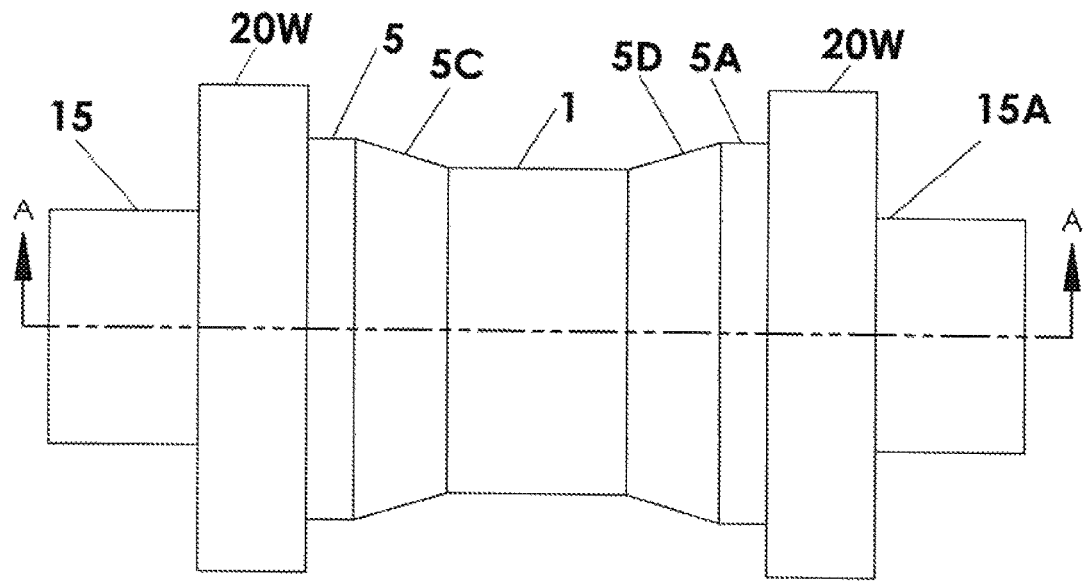
FIG. 17 is a side elevation of a coupling body modified to connect opposite ends of two plain end pipes.
Figure 18:
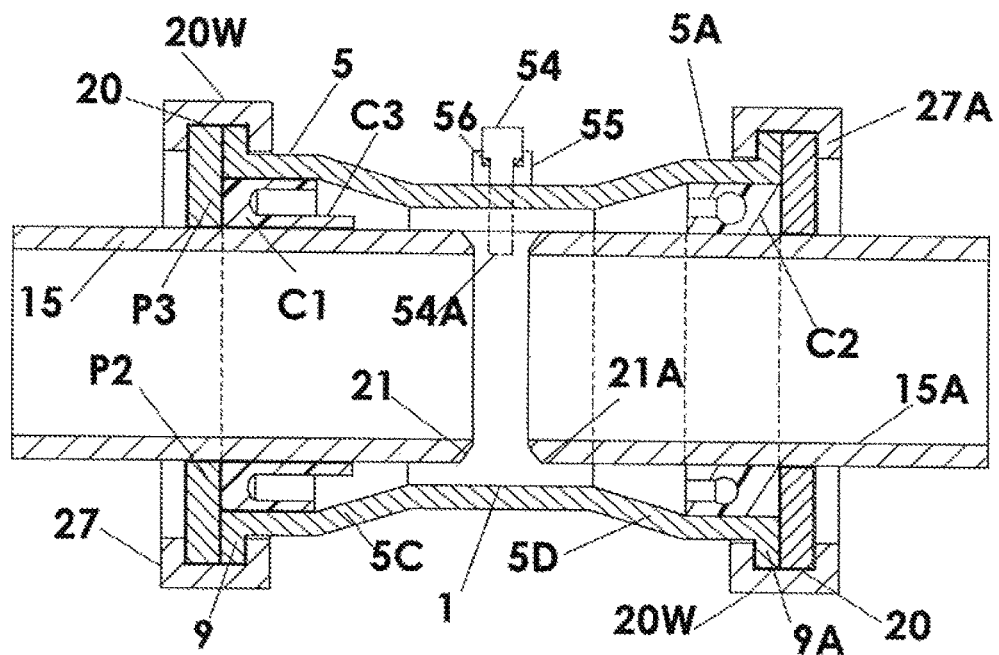
FIG. 18 is a transverse longitudinal vertical section of the coupling of FIG. 17.

FIGS. 17 and 18 show a modified coupling body to connect plain end pipes.

Figure 8:
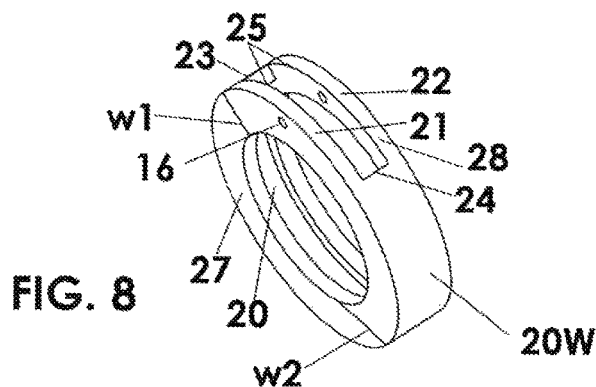
FIG. 8 is a perspective view of a wheel to accommodate a plurality of wedges.
Figure 9:
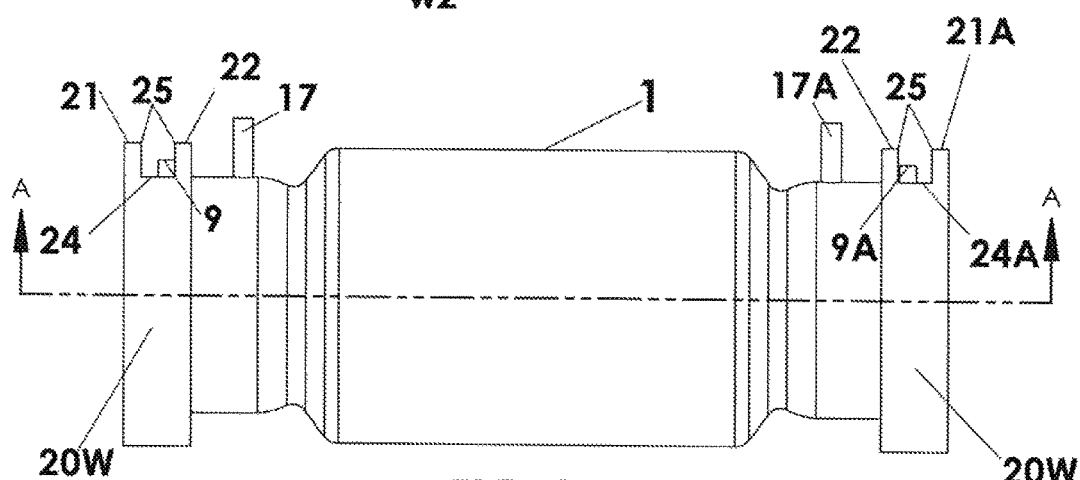
FIG. 9 is a side elevation of a coupling body showing wheels at each end of the coupling and showing the opening cut in each wheel at the top of each wheel with no wedges mounted in the wheel.
Figure 10:
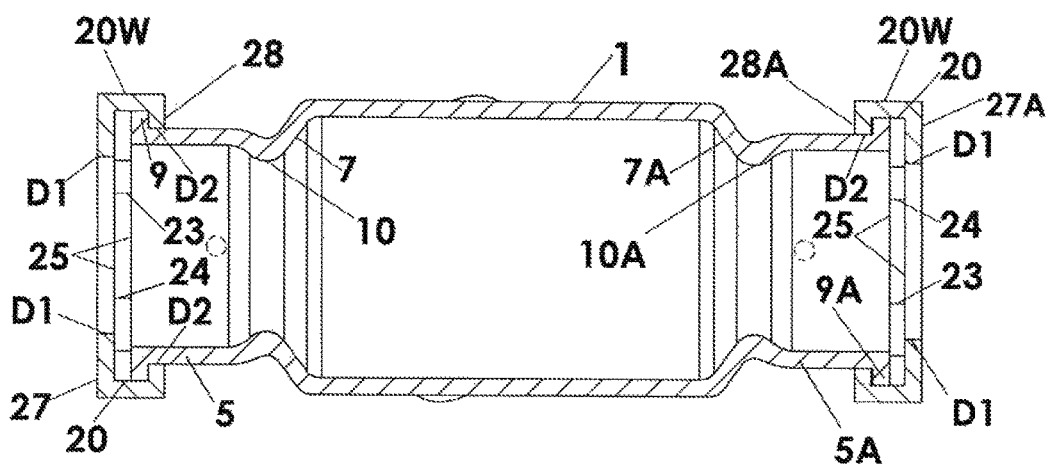
FIG. 10 is a transverse longitudinal horizontal section of the coupling of FIG. 9 taken on the line A-A of FIG. 9.

A general introduction to the invention can be had with the illustrated embodiment shown in the drawings presented in this paragraph. The coupling includes a coupling body C with central portion 1 provided with mini flanges 9 and 9A at opposite ends of the coupling body as shown in FIG. 1. Radially channeled wheel 20W, shown in FIGS. 8, 2A, and 2B, is constructed around each mini flange 9 and 9A as shown in FIGS. 2C and 2D. Each wheel 20W includes an outer long wall 27 and an inner short wall 28, FIGS. 8 and 2A, which form the channel 20 therebetween to accept a mini flange 9 or 9A therein, FIGS. 2D, 9, and 10. The channel 20 in each wheel 20W is loaded with radial wedges P1, P2, P3, and P4, made of flat plates, which fit into channel 20 between flange 9 or 9A and outer walls 27, 27A, FIG. 2D. Wedges P1, P2, P3, and P4 are inserted into channel 20 through cut opening 25 in wheel 20W, FIGS. 8 and 9. FIG. 2D shows the wedges in place in channel 20 between flanges 9 or 9A, and outer walls 27, 27A. Wedges P1, P2, P3, and P4 are shaped as sections of a washer (like wedges of cut pie pieces without the point) so fit together to form a center central wedge opening shown in FIG. 2B. With the end portion of a pipe 15 inserted into the connector body C through the central opening in outer wall 27 having a diameter D1 so that flange 14 or shoulder 41 passes through the central opening and is inside connector body C, wedges P1, P2, P3, and P4 are inserted into channel 20 and extend inwardly beyond the diameter D1 of the central opening through outer wall 27, FIGS. 2A and 2D, to form a smaller central wedge opening with a diameter approximately equal to the outer diameter of the pipe 15, 15A. In this way, wedges P1, P2, P3, and P4 will engage flange 14 or shoulder 41 and prevent it from passing out of connector body C.

Figures 2A, 2B:
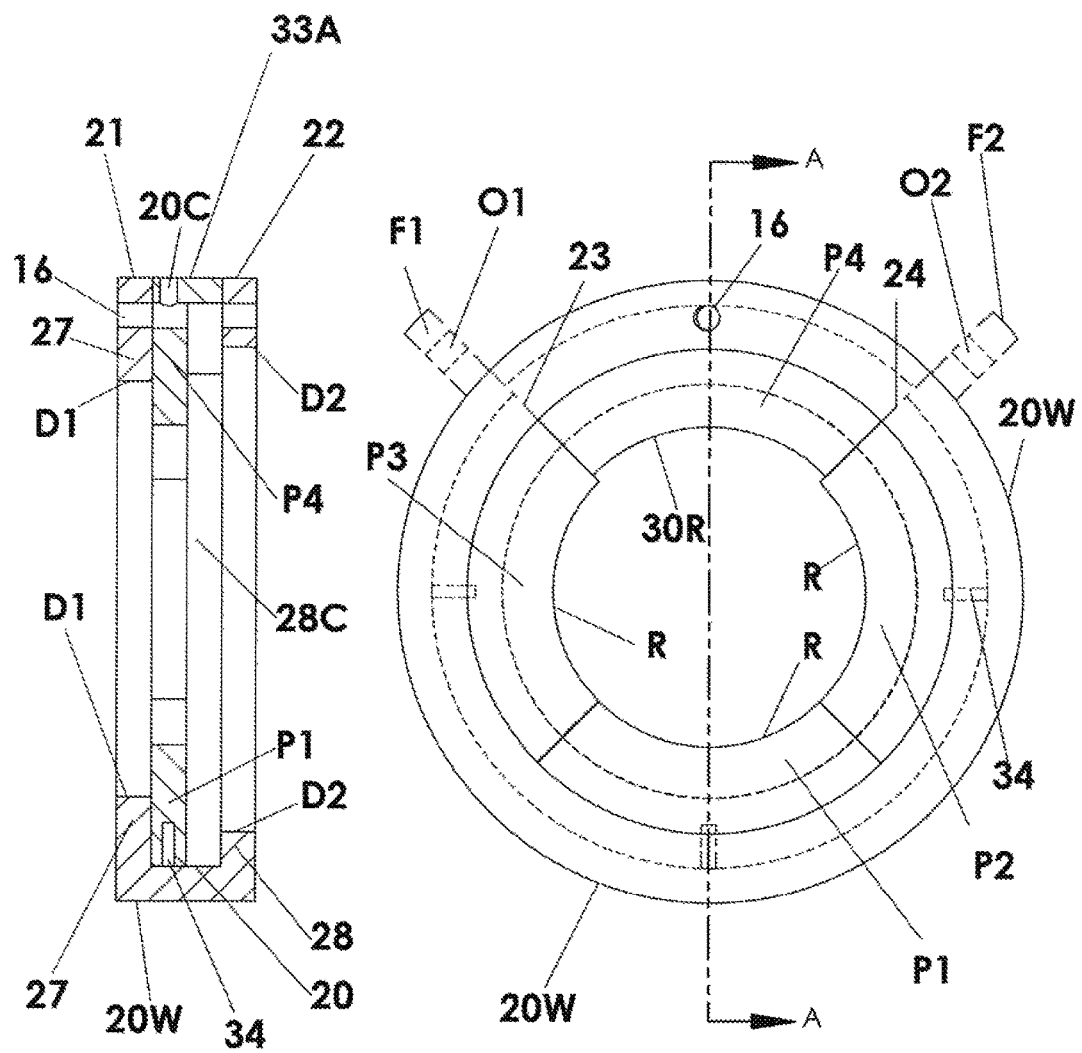
FIG. 2A is a vertical section taken on the line A-A of FIG. 2B, showing a wheel that would be mounted on the end flanges of the coupling of FIGS. 1 and 2, showing the wheel alone, not mounted on a coupling, and showing wedges loaded in the wheel channel.
FIG. 2B is front elevation of the wheel of FIG. 2A.

Flange 14, 14A, FIG. 2, may be welded to pipe 15, 15A, or shoulder 41, 41A, FIG. 2D, may be formed integral with pipe 15, 15A, or constructed by welding a shoulder ring around or to the end portion of pipe 15, 15A. In the case of plastic PVC or polyethylene pipe, to make a shoulder, a steel ring can be dropped into the properly sized groove or a shoulder ring made of PCV and/or polyethylene can be fused to the end of these pipes. In the case of fiberglass pipe, a fiberglass sleeve can be cemented around the end portion of pipe to make the shoulder around the end portion of pipe.

The engagement between the wedges P1, P2, P3, and P4 and a flange 14 or shoulder 41 restrains the pipe in the coupling body, and that pipe cannot be pulled out of the coupling body. The inner radius 30R of P4 can be made larger than the radii R of P1, P2, and P3 so that P4 has the least contact with the pipe flange or shoulder, unless extra thickness is provided to strengthen the wall of the cut opening which is a portion of wall 27 of wheel 20W. FIG. 18 shows no shoulders on the pipe ends, where the coupling joins two plain end pipes. FIGS. 2E and 2F show the wedge P4 included with a wedge cover 33A. The number of wedges used can vary with large size couplings generally having more than three wedges. Further, while it is preferred to have wedges substantially surrounding the pipe as inserted into the coupling body, fewer wedges can be used so that the pipe is not completely surrounded with wedges. The wedges that are used will still block the pipe from being pulled from the coupling body. Inner radii R of the wedges with respect to the outer radius R1 of shoulders 14 in FIG. 2 and shoulder 41 in FIG. 2D depend on the designed flexible angle of pipe. The outer radius R1 of flange 14 in FIG. 2, and outer radius of shoulder 41 in FIGS. 2D and 12 is always greater than the inner radii of wedges P1, P2, P3, and P4 to an extent that under no condition can the pipe be pulled out of the coupling body. Various designs of seals are shown in the drawings, and other seal designs can be used. Wheels 20W shown in FIG. 8 are constructed around mini flanges 9 and 9A in the manufacturing plant, also preferably seals are installed in the coupling body in the manufacturing plant. Each coupling is shipped to the job site with wedges stored inside the coupling body in a box or wedges are shipped separately in the box. Perspective views of parts and assembly drawings depict the invention clearly, therefore only needed hidden lines are shown in cross sectional drawings. Pipes will be discussed along with a procedure to mount the coupling around the end portions of pipes to connect two pipes. From here on the coupling body will be referred to by calling it coupling only.

FIGS. 1, 2, 3, 11 and 12 without wheels and FIGS. 2C, 2D, 9, 10, 14, 15, 17 and 18 with wheels can be studied together. The coupling in each FIG. is provided with mini flanges 9 and 9A on opposite ends of sections 5 and 5A of the coupling body. Mini flanges may be constructed integrally with the coupling or mini flanges may be constructed by welding them around end portions of coupling. Wheel 20W is installed around each mini flange 9 and 9A in the manufacturing plant. Each wheel 20W can be constructed around mini flanges 9 and 9A by welding preferably two arcuate channels, where inner short wall 28A of each opposite wheel 20W is positioned behind flanges 9 and 9A, and long walls 27 and 27A are positioned at outer most distance from said mini flanges respectively. Wheel 20W is shown in FIGS. 2A, 2B and FIG. 8 where, welding of two said arcuates is shown by welds w1 and w2 in FIG. 8. Wheel 20W is provided with cut opening 25 between end of cuts 23 and 24. Two opposite openings 16 are provided (in opposite walls 21 and 22 of cut 25) for bolt 29A for cover 33A shown in FIGS. 2E and 2F. Nut for bolt stem 29B is not shown.

In FIGS. 1, 2, 2C, 2D, 3, 9, 10, 11 and 12 the central portion 1 of coupling C is much longer than the sum total length of two opposite portions 5 and 5A, so that end portion of each pipe always remain in contact with the elastomeric seal around the pipe. The relative lengths of 1 and 5 and 5A depend on allowable designed thermal expansion and contraction, including shortening of the pipes under the Poisson's Ratio effect.

In FIG. 2 cavities 13 and 13A for seals 11 and 11A (seal 11A is not shown) are created between opposite ends of a partitioner 12 made of elastomeric split tube, and opposite slanting walls 6 and 6A of the coupling body. Partitioner 12 made from elastomeric sheet is glued to the inner surface 1A of the central portion 1 of coupling body C.

Figure 6:
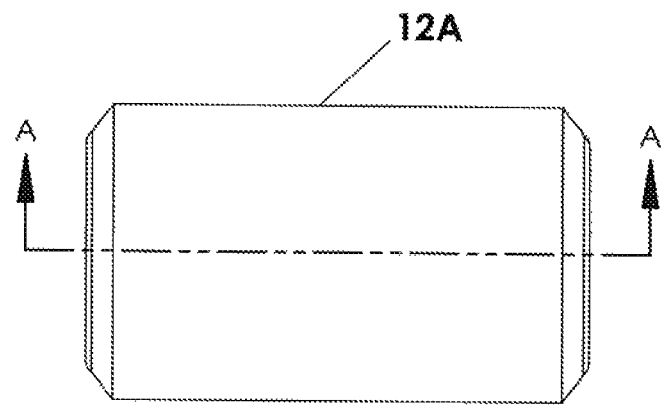
FIG. 6 is a side view of a monolithic seal usable with the coupling of the invention.
Figure 7:
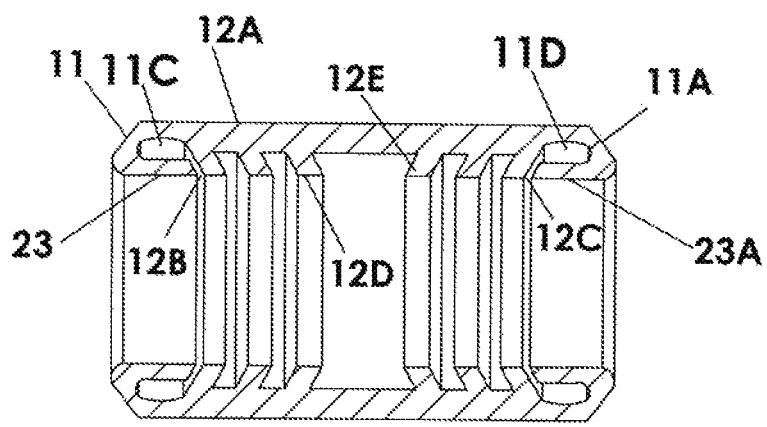
FIG. 7 is a transverse longitudinal vertical section of the seal of FIG. 6 taken on the line A-A of FIG. 6.

FIG. 2D will be studied with the aid of FIG. 6 and FIG. 7. FIG. 2D shows elastomeric monolithic structure 12A. Seals 11 and 11A and partitioner 12 of FIG. 2 are integrated with partitioner 12 to make 12A. Cavities 11C and 11D in end seals 11 and 11A in FIG. 2D get pressurized with fluid through passages 12B and 12C respectively, thus preventing leaking of fluid from the coupling body. Protrusion 12D and 12E are optional, they may be removed entirely.

Figure 4:
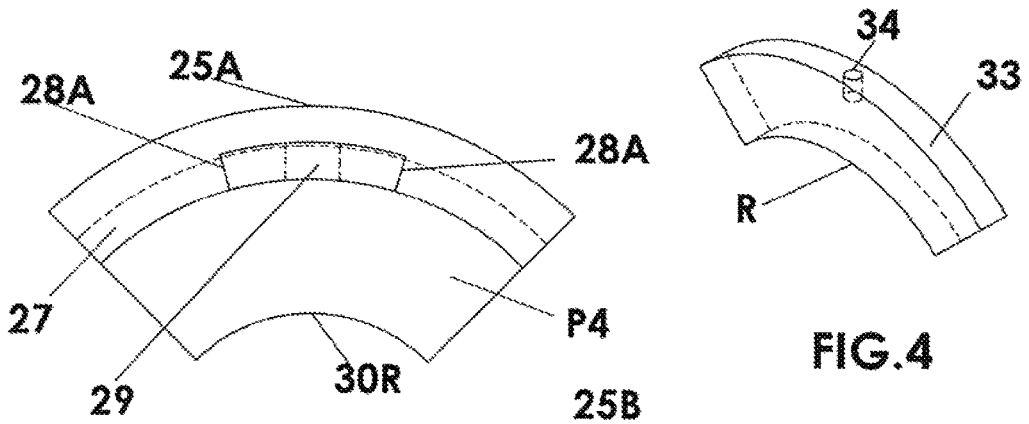
FIG. 4 is a further perspective view of the wedge shown in FIG. 3.
Figure 5:
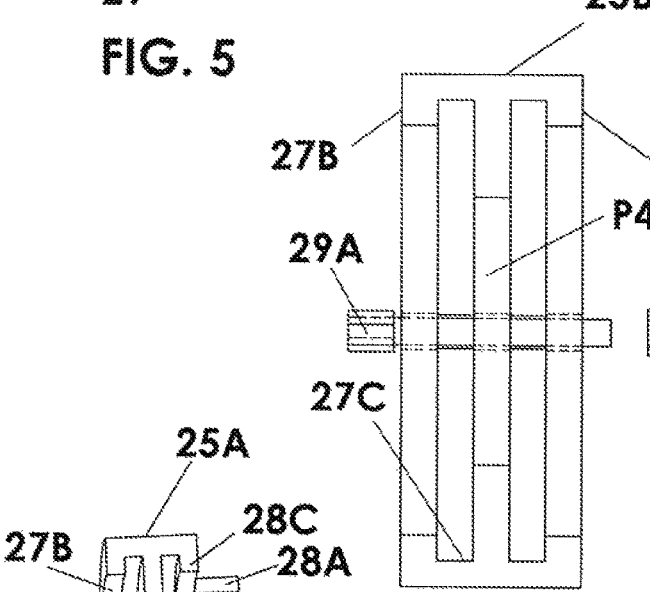
FIG. 5 is a side view of the wedge cover shown in FIG. 3.
Figure 5A:
FIG. 5A is bottom view of a further alternate design of wedge cover.
Figure 13:
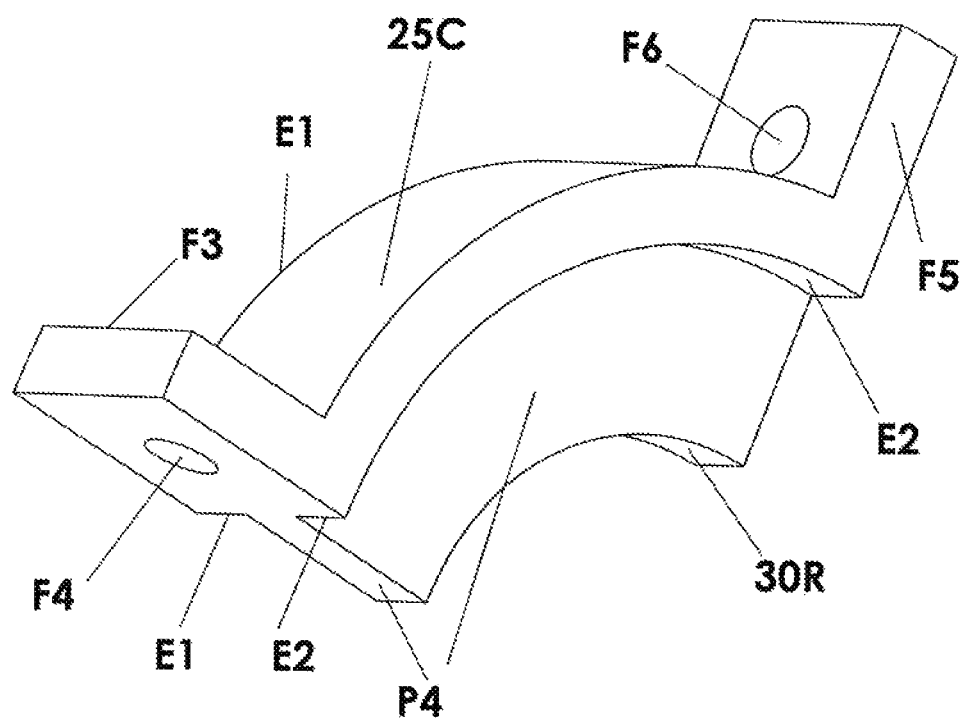
FIG. 13 is perspective view of a still further alternate design of wedge cover provided with two opposite flanges to be connected with two corresponding flanges constructed at two opposite ends of the open cut of wheel.

FIGS. 2E, 2F, 3, 5, 5A and 13 of alternate designs of wedge covers can be studied simultaneously. Each different alternate design of wedge cover presented may be suitable in different situation at different location. Wall 27B shown in FIG. 3 and FIG. 5A are optional. Wedge covers are to cover open cut 25 between 23 and 24 in the wheel 20W shown in FIG. 8. Wedge P4 preferably is integrated with wedge cover 25A (as shown in FIG. 3 and FIG. 5); and wedge cover 25C as shown in FIG. 13. It is pointed out here that in low fluid pressure pipe line, walls 27B and 28C for wedge covers are optional as they are not shown in FIG. 2E and FIG. 2F., but for high fluid pressure in pipe lines, cover wall 28C against mini flanges 9 and 9A will be provided. Cover 25A (shown in FIGS. 3 and 5) is provided with an extension shown with sides 28A and 28B, and with opening 29. Opening 29 is mounted around anchored bolt 17 to secure 25A to the coupling body with a nut, where the nut is not shown. FIG. 13 shows wedge cover 25C with integrated P4. The inner surface of cover 25C is depicted with E1 and E2. Two flanges F3 and F5 of wedge cover 25C (shown in FIG. 13) can be connected with matching flanges F1 and F2 shown in FIG. 2B, by matching openings F4 and F5 and O1 and O2 in corresponding flanges F4 and F5; and F1 and F2 are held together by means of bolt fasteners (bolts are not shown). Flanges F1 and F2 are depicted with phantom lines in FIG. 2B. FIG. 2A and FIG. 2B show an isolated wheel loaded with wedges P1 to P4 respectively. Gap 28C in FIG. 2A is provided for the mini flanges 9 or 9A. The open cut 25 shown in the wheel in FIG. 8 is provided to receive wedges 33 shaped as arcuate flat plates P1, P2, and P3 shown in FIGS. 3 and 4. Inner radius of each arcuate wedge 33 is depicted with R and hole 34 is provided to pry wedge 33 out of cut 25 or to move 33 in cut 25. Hole 34 may be threaded. Similar to hole 34, hole 20 C is provided in wedge cove 33A shown in FIG. 2E. Bolt 29A is provided with nut N shown in FIG. 5A. It is understood that wheels 20W mounted at each end of coupling body 1 around flanges 9 and 9A are of the same design. Mounted wheels around mini flanges 9 and 9A are shown in FIGS. 2C, 2D, 9, 10, 14, 15, 17 and 18. Each wheel 20W is constructed around flanges 9 and 9A by welding preferably two arcuates channels, where welds are indicated by W1 and W2 in FIG. 8.

In FIG. 14, section 1 of coupling is modified to a straight cylindrical piece by retaining mini flanges 9 and 9A. Coupling is designed to connect pipe 15 to end portion 15V of a valve. Shoulders 14 and 14V are provided around the end portions of 15 and 15V, which also function as backup shoulders for seals S8 and S9. In the manufacturing plant, cylindrical partitioner 47 with flanges 48 and 48A is fitted inside of the coupling under section 1 and is held in place by means of at least one bolt shown with bolt head 54 and bolt stem 54A. Bolt head 54 is mounted against seal gasket 56 inside socket 55 welded to the coupling body. At the job site, seals S8 and S9 are mounted around seats 19 and 19V, respectively. First on left side around pipe 15, the coupling with wheel W20 is mounted around shoulder 14 and wedges are loaded into wheel W20, and the opening cut in the wheel cover is closed with a wedge cover as previously explained. Two wedges P2 and P3 around 15 are shown inside wheel 20W. Then the coupling (already fitted with partitioner 47 under section 1 to maintain a constant gap between end 21 and 21V, is pushed around shoulder 14V till wall 27A of wheel W20 reach a mark around end portion 15V (mark is not shown). Similar to the left side, wedges are loaded into the wheel W20 and the cut opening 25 is closed with a wedge cover. When it is needed, seals S8 and S9 can be replaced by removing partitioner 47 by removing bolt 54 and by removing wedges only from the right side from space P5; and wedges on the left side are not removed from wheel 20. The coupling is pushed away from around shoulder 14 to release partitioner 47. Handles depicted by 51 are provided to catch partitioner 47 to remove it from the coupling body or to assist it to be mounted inside the coupling. Once the seals are replaced then in reverse order the coupling is reassembled around 14 and 14V.

FIG. 15 is the same coupling as shown in FIG. 14; but two arcuate rings R3 (shown in FIG. 16) of a half circle each are held to shoulder 14V in space P5, FIG. 14 by a weld. Each arcuate ring R3 is provided with cam grooves or cam openings G1, G2, G3 and G4. Four 90 degree arcuate radial jaw members 20V (as explained in inventor's U.S. Pat. No. 5,387,017) are held to said grooves by means of friction dowel pins or by means of bolts as shown by bolts B1, B2, B3 and B4 in FIG. 15 and FIG. 16. The inner radial flanges 28A and outer radial flanges 27A of jaws 20V can be lowered or they can be raised to catch flange 9A or to free flange 9A by rotating jaws 20V around arcuate rings R3 by means of handles depicted with 17V and 18V. One end of each handle is held to flat radial piece of jaw 27A (preferably by weld) and the other end has a rotatable fit against wall of valve 16V.

FIG. 17 and FIG. 18 will be studied together. FIG. 18 is a transverse longitudinal vertical section of the coupling in FIG. 17. Diametrically section 1 is provided with a smaller diameter than section 5 and 5A by providing tapering sections 5C and 5D between section 1 and section 5C; and between section 1 and 5A respectively. Wheels and the wedges are the same as in other couplings, but wedges at both ends of coupling function as backup rings for seals C1 and C2. Seals C1 and C2 are designed to make hydraulic grips around pipe 15 and pipe 15A. This arrangement becomes practical if each pipe at its midpoint is anchored against any movement or both ends of each pipe are anchored next to each coupling. At least one bolt 54 with stem 54 A is provided to prevent disengagement of the coupling from the pipes. Bolt 54 is mounted against seal 56 into socket 55 which is welded to section 1. It should be noted that the pipe end portions shown in FIGS. 17 and 18 are plain end pipe portions, i.e., there are no circumferential flanges or circumferential shoulders on the pipe end portions. With these pipe ends, the seals C1 and C2, which can be referred to as seal assemblies and may be single piece elastomeric seals as shown or include rigid backup rings, are held in place by the wedge members which hold the seal assemblies aligned with the outer side of the coupling body flanges, as shown. Here, the wedge members hold the seal assemblies in the coupling body and prevent the seal assemblies from passing out of the coupling body through the coupling body opening.

Now the mounting of coupling C around the end portions of two pipes in FIGS. 2 and 2D is described, and the same procedure applies for couplings shown in other FIGS. In both cases the procedure to mount coupling C shown in FIGS. 2 and 2D with rotatable wheels around mini flanges 9 and 9A and coupling pre fitted with inner seals 11 and 11A is the same. To connect the coupling to end portions of pipes, first one end of the coupling is loosely mounted around end 21 of first pipe 15, and the coupling is pushed till section 5 covers shoulder 14 and outer wall 27 (not shown in FIG. 2) of the wheel is positioned against a temporary chalk mark on pipe. Then, first wedge with number P1 is loaded into wheel 20W, then other wedges P2 and P3 are loaded into the wheel 20W in their sequence till they are circumferentially positioned around the pipe 15, The wedges are locked into their positions with means of a wedge cover P4 which is means to close cut opening 25 in the wheel 20. In what sequence wedges are loaded into wheel 20W is immaterial. The wedge cover is secured in place in the wheel by passing a stem 29B of bolt 29A through the walls 27 and 28 of the wheel, including inner integral wedge P4 of cover 33A and mini flange 9. Bolt 29A is fastened in place by tightening a nut N around stem 29B, shown in FIG. 5A. If desired, the wedge cover 33A can be welded to cut opening 25, where opening 25 is depicted by 21, 22, 23, and 24 in wheel 20W. When needed, the weld can be grounded off with a grinder to free the wedge cover 33A, and to free other wedges. After the wedges are mounted inside of first wheel, then the first pipe cannot be pulled out of the coupling body. Thereafter, the end of the second pipe 21A is pushed into the other end of the coupling body and, similarly to the first end of pipe, the end portion of the second pipe is properly connected with the coupling body. When it is needed to remove the wedges out of the wheel, first the bolt to secure the wedge cover is removed. Then the wheel is rotated and wedges are caught when they fall one by one out of the wheel. If wedge cover 33A was welded to the cut opening 25 then, as mentioned above, the weld is grounded off with a grinder to free wedge cover 33A, and to free other wedges P1, P2, and P3. It is understood that all couplings can be provided with more than four wedges. Wedge cover 33A is distinguished from other wedge covers 25A and 25B by removing walls 27B and 28C shown in FIGS. 3, 5, and 5A.

FIGS. 11 and 12 show transverse longitudinal vertical sections of similar further embodiments of couplings of the invention showing special seals for use with the couplings. FIG. 11 shows the outer diameters of sections 5, 1, and 5A of the same diameters, while FIG. 12 shows in solid lines the diameters of sections 5 and 5A smaller than section 1. Each of FIGS. 11 and 12 show the Sections 5, 1, and 5A separated by two reverse cavities, where each reverse cavity forms an inner curved portion 7A, 7C, which extends radially inwardly into the coupling to form a projection into the coupling to receive and surround a portion of the end portion of the pipe when received in the coupling. Each inner curved portion 7A, 7C is fitted with a seal around its walls 7 and 7B and bottom section 7A, (only one seal is shown in the left hand side of the coupling in FIG. 11, and only FIG. 12 shows the end portion of a pipe 15 inserted into the coupling). As shown, the seal has opposite end portions with a groove between the opposite end portions adapted to receive the projection formed by the inner curved portion 7A or 7C. Seal section S6 is delineated by its lips S2 and S3 and sections S4, S7, and S5. Section S7 is seated around pipe end portion 40 of pipe 15, FIG. 12. When pipe end portion 40 is pushed through the seal into the coupling, wall 7B of inner curved portion 7A prevents the movement of the seal in the coupling by reaction against seal section S5. If pipe end portion 40 is pulled through the seal out of the coupling, wall 7 of inner curved portion 7A prevents the movement of the seal in the coupling by reaction against the inner seal section S6. When seal section S6 is pressurized by fluid, then extra thickness provided to section S4 prevents any leakage of fluid between pipe end portion 40 of pipe 15 and section 7A of the inner curved portion, and between wall 7 of the inner curved portion and section S6 of the seal. The advantage of this seal is that it does not need partitioner 12 as shown in FIG. 2, and the seal will not be dislocated during mounting or dismounting of the coupling around end portion 40 of pipe 15. This seal can be installed in the manufacturing plant or in the field. The inner surface of section 1 is depicted by 1E.

FIG. 12 shows in broken lines how a coupling according to the illustrated embodiments of the invention can be modified to provide a bell joint type of coupling according to the invention. Rather than the center section 1 of the coupling extending between inner curved portions such as 7A and 7C and having opposite coupling openings in which to receive the end portions of pipes to be connected as shown in FIG. 11 and in solid lines in FIG. 12, approximately from the middle of section 1 of the coupling body, transition is made as shown in broken lines in FIG. 12 from point 1A to point 1W to shape the coupling to be a bell joint. The transition is shown by phantom lines 1B and P1, where 1B and P1 depicts the thickness of the wall of that transition. Various methods of construction can be used. The bell joint coupling as created is welded to the end of pipe P shown at point 1W which is the end point of the transition. The inner diameter of pipe P is depicted with 1C, and the inner surface and outer surface of said transition is indicated with P1 and 1B respectively. The end portion of pipe P is shown in broken lines between 1W and 1D.

It should be noted that the circumferential pipe shoulder or circumferential pipe flange is shown and described as being spaced from the end of the pipe. This spacing is provided so that when the circumferential pipe shoulder or circumferential pipe flange engages or abuts the wedge members which hold the pipe end portion in the coupling body so the pipe cannot be pulled from the coupling, the pipe end remains a distance into the coupling body so that it still engages the seal in the coupling body so that the coupling resists leaking. This is important when the coupling is provided as a seismically stable coupling. Further, the drawings illustrate the pipe ends within the coupling as being separated. This separation provides room for pipe movement such as pipe expansion if and when it occurs, such as due to temperature changes or pressure changes in the pipes.

While the invention has been described with respect to presently preferred illustrated embodiments, it is understood that the coupling body and wedges may be coated with any type of proper coating to insulate the coupling to break the passage of electric current through the coupling body and to protect the coupling against rust. It is also understood that any corners may be rounded off or where needed tappers may be provided to any section of the coupling body or of other parts. It is further understood that various changes may be made in adapting the invention to different embodiments without departing from the broader concepts disclosed herein and comprehended by the claims that follow.

The invention claimed is:

1. A coupling to connect an end portion of a pipe to an end portion of another pipe or to a valve or other fitting wherein the end portion of the pipe includes an end of the pipe and a circumferential shoulder spaced from the end of the pipe, comprising:
    a coupling body to receive the end portion of the pipe therein;
    a coupling body opening through which the end portion of the pipe is inserted into the coupling body;
    a coupling body flange around the coupling body opening, said coupling body flange having a coupling body flange thickness;
    a wheel rotatably mounted on the coupling body flange, said wheel having an inner wheel wall and an outer wheel wall forming a channel therebetween which receives the coupling body flange therein, said outer wheel wall having a central wheel opening with a diameter at least as great as the outside diameter of the circumferential shoulder of the pipe to be received through the coupling body opening into the coupling body and said channel having a width large enough to receive a wedge member in the form of a flat plate therein in side-by-side relationship with the coupling body flange received in the channel, and said wheel having a cut opening along a circumferential portion of the wheel, said cut opening sized to allow the wedge member to be mounted into the channel from outside the wheel;
    wherein, when the end portion of the pipe including the circumferential shoulder is received in the coupling body, the wedge member can be mounted through the cut opening in the wheel into the wheel channel to be positioned in the wheel channel to extend toward the end portion of the pipe passing through the central wheel opening into the coupling body opening to provide a central wedge opening around the pipe of diameter less than the central wheel opening to prevent the circumferential shoulder from passing out of the coupling body through the coupling body opening; and
    wherein an outermost circumferential surface of the wedge member has a diameter equivalent to an outer diameter of the coupling body flange and an innermost circumferential surface of the wedge member being smaller than a diameter of the circumferential shoulder wherein the wedge member is shaped in the form of a portion of a washer.

2. A coupling according to claim 1, additionally including a seal within the coupling body cooperative with the pipe end portion when the pipe end portion of the pipe including the circumferential shoulder is received in the coupling body.

3. A coupling according to claim 2, wherein the coupling body includes an inner curved portion extending radially inwardly toward the pipe end portion when the pipe end portion is inserted into the coupling body.

4. A coupling according to claim 3, wherein the seal is associated with the inner curved portion.

5. A coupling according to claim 4, wherein the seal associated with the inner curved portion includes opposite end portions and a groove between the opposite end portions adapted to receive the inner curved portion and hold the seal from sliding with respect to the inner curved portion.

6. A coupling according to claim 2, wherein the seal is positioned within the coupling body so that it remains cooperative with the pipe end portion when the wedge members prevent the pipe end portion circumferential shoulder from passing out of the coupling body through the coupling body opening.

7. A coupling according to claim 2, wherein the seal is responsive to fluid pressure within the coupling.

8. A coupling according to claim 1, additionally including means to close the cut opening in the wheel.

9. A coupling according to claim 8, additionally including a set of wedge members.

10. A coupling according to claim 9, wherein the means to close the cut opening in the wheel includes one wedge member of the set of wedge members, said one wedge member adapted to fit into the channel adjacent the cut opening.

11. A coupling according to claim 9, additionally including means for moving the wedge members inside the cut opening.

12. A coupling according to claim 11, wherein the means for moving the wedge members includes a hole in respective wedge members of the set of wedge members adapted to receive an end of a moving tool.

13. A coupling according to claim 12, wherein the hole in the respective wedge members is threaded.

14. A coupling according to claim 1, wherein the coupling body is elongate and additionally includes a second coupling body opening through which the end portion of a second pipe or valve or other fitting to be joined which includes an end of the pipe or valve or other fitting and a circumferential shoulder spaced from the end of the pipe or valve or other fitting can be inserted into the coupling, said second coupling body opening including a second coupling body flange around the second coupling body opening and a second wheel rotatably mounted on the second coupling body flange, said second wheel having an inner second wheel wall and an outer second wheel wall forming a second wheel channel therebetween which receives the second coupling body flange therein, said outer second wheel wall having a central second wheel opening with a diameter at least as great as the outside diameter of the circumferential shoulder of the pipe or valve or other fitting to be received through the second coupling body opening into the coupling body and said second wheel channel having a width large enough to receive a second coupling body opening wedge member in the form of a flat plate therein in side-by-side relationship with the second coupling body flange received in the second wheel channel, and said second wheel having a second wheel cut opening along a circumferential portion of the second wheel, said second wheel cut opening sized to allow the second coupling body opening wedge member to be mounted into the second wheel channel from outside the second wheel.

15. A coupling according to claim 1, wherein the coupling body is elongate and additionally includes a second coupling body opening through which the end portion of a second pipe or valve or other fitting to be joined which includes an end of the pipe or valve or other fitting and a circumferential shoulder spaced from the end of the second pipe or valve or other fitting can be inserted into the coupling, said second coupling body opening including a second coupling body flange around the second coupling body opening, and additionally including a set of jaw members, each jaw member having an inner jaw member flange and an outer jaw member flange forming a jaw member channel therebetween, said jaw member channel being wide enough to receive the second coupling body flange therein, said jaw members being movably mounted on the outside of the circumferential shoulder spaced from the end of the second pipe or valve or other fitting for camming movement toward the coupling body with simultaneous circumferential movement partially around the second pipe or valve or other fitting in one direction and movement away from the coupling body with simultaneous circumferential movement partially around the second pipe or valve or other fitting in the opposite direction, whereby when the jaw members of the set move toward the coupling body to a closed position they engage the second coupling body flange so the second pipe or valve or other fitting to be joined cannot be removed from the coupling body and when the jaw members of the set move away from the coupling body to an open position they disengage the second coupling body flange so the second pipe or valve or other fitting to be joined can be removed from the coupling body; and means for moving the jaw members of the set with respect to the coupling body.

16. A coupling to connect an end portion of a pipe to an end portion of another pipe or to a valve or other fitting wherein the end portion of the pipe includes an end of the pipe and a circumferential shoulder spaced from the end of the pipe, comprising:
   a coupling body to receive the end portion of the pipe therein;
   a coupling body opening through which the end portion of the pipe is inserted into the coupling body;
   a coupling body flange around the coupling body opening, said coupling body flange having a coupling body flange thickness;
   at least one wedge member in the form of a flat plate, each said at least one wedge member having a wedge member thickness;
   a wheel rotatably mounted on the coupling body flange, said wheel having an inner wheel wall and an outer wheel wall forming a channel therebetween which receives the coupling body flange therein, said outer wheel wall having a central wheel opening with a diameter at least as great as the outside diameter of the circumferential shoulder of the pipe and said channel having a width at least equal to the combined thicknesses of the coupling body flange thickness and the wedge member thickness whereby the channel can receive one of the at least one wedge member therein in side-by-side relationship with the coupling body flange, and said wheel having a cut opening along a circumferential portion of the wheel, said cut opening sized to allow the at least one wedge member to be mounted into the channel from outside the wheel;
   wherein, when the end portion of the pipe including the circumferential shoulder is received in the coupling body, the at least one wedge member can be mounted through the cut opening in the wheel into the wheel channel to be positioned in the wheel channel to extend toward the end portion of the pipe passing through the central wheel opening into the coupling body opening to provide a central wedge opening around the pipe of diameter less than the central wheel opening to prevent the circumferential shoulder from passing out of the coupling body through the coupling body opening; and
   a seal cooperative with the pipe end portion when the pipe end portion of the pipe including the circumferential shoulder is received in the coupling body;
   wherein an outermost circumferential surface of the wedge member has a diameter equivalent to an outer diameter of the coupling body flange and an innermost circumferential surface of the wedge member being smaller than a diameter of the circumferential shoulder wherein the wedge member is shaped in the form of a portion of a washer.

17. A coupling according to claim 16, additionally including means to close the cut opening in the wheel.

18. A coupling according to claim 17, wherein the means to close the cut opening in the wheel includes one wedge member of the at least one wedge member, said one wedge member adapted to fit into the channel adjacent the cut opening.

19. A coupling according to claim 16, additionally including means for moving the at least one wedge member inside the cut opening.

20. A coupling according to claim 19, wherein the means for moving the at least one wedge member includes a hole in the at least one wedge member adapted to receive an end of a moving tool.

21. A coupling to connect an end portion of a pipe to an end portion of another pipe or to a valve or other fitting, comprising:
   a coupling body to receive the end portion of the pipe therein;
   a coupling body opening through which the end portion of the pipe is inserted into the coupling body;
   a coupling body flange around the coupling body opening, said coupling body flange having a coupling body flange thickness and having an outer edge;
   a plurality of wedge members in the form of flat plates, each wedge member having a wedge member thickness;

a wheel rotatably mounted on the coupling body flange, said wheel having an inner wheel wall and an outer wheel wall forming a channel therebetween which receives the coupling body flange therein, said outer wheel wall having a central wheel opening with a diameter large enough to receive the end portion of the pipe therethrough when the end portion of the pipe is inserted into the coupling body and said channel having a width at least equal to the combined thicknesses of the coupling body flange thickness and the wedge member thickness whereby the channel can receive a wedge member from the plurality of wedge members therein in side-by-side relationship with the coupling body flange, and said wheel having a cut opening along a circumferential portion of the wheel, said cut opening sized to allow the wedge member to be mounted into the channel from outside the wheel;

wherein, when the end portion of the pipe is received in the coupling body, wedge members from the plurality of wedge members can be mounted through the cut opening in the wheel into the wheel channel to be positioned in the wheel channel to extend toward the end portion of the pipe passing through the central wheel opening into the coupling body opening to provide a central wedge opening around the pipe of diameter less than the central wheel opening; and wherein an outermost circumferential surface of the wedge member has a diameter equivalent to an outer diameter of the coupling body flange and an innermost circumferential surface of the wedge member being smaller than a diameter of the circumferential shoulder wherein the wedge member is shaped in the form of a portion of a washer.

* * * * *